United States Patent
Sheng et al.

(10) Patent No.: US 12,350,903 B2
(45) Date of Patent: Jul. 8, 2025

(54) SCALABLE FABRICATION OF WRINKLE-FREE AND STRESS-FREE METALLIC AND METALLIC OXIDE FILMS

(71) Applicant: The Texas A&M University System, College Station, TX (US)

(72) Inventors: Jian Sheng, Corpus Christi, TX (US); Maryam Jalali-Mousavi, Woodbury, MN (US); Andrew R. White, Corpus Christi, TX (US)

(73) Assignee: The Texas A&M University System, College Station, TX (US)

( * ) Notice: Subject to any disclaimer, the term of this patent is extended or adjusted under 35 U.S.C. 154(b) by 650 days.

(21) Appl. No.: 16/856,357

(22) Filed: Apr. 23, 2020

(65) Prior Publication Data

US 2020/0338861 A1 Oct. 29, 2020

Related U.S. Application Data

(60) Provisional application No. 62/837,560, filed on Apr. 23, 2019.

(51) Int. Cl.
*B32B 27/14* (2006.01)
*B32B 5/16* (2006.01)
(Continued)

(52) U.S. Cl.
CPC .............. *B32B 15/08* (2013.01); *B32B 5/16* (2013.01); *B32B 15/20* (2013.01); *B32B 27/14* (2013.01);
(Continued)

(58) Field of Classification Search
CPC ....... A47J 27/10; B01F 33/862; B01F 35/413; B01L 2300/1827; B01L 7/00; H05B 1/0244; H05B 1/0247; H05B 1/0252; H05B 1/0297; H05B 2203/013; H05B 2203/021; H05B 3/34; H05B 3/42; H05B 3/44; H05B 3/80; H05B 1/0261; H05B 3/78; B32B 15/08; B32B 15/20; B32B 2250/03;
(Continued)

(56) References Cited

U.S. PATENT DOCUMENTS

2012/0214100 A1* 8/2012 Kobayashi ............ G03F 7/0045
430/285.1

FOREIGN PATENT DOCUMENTS

WO WO2018169737 * 9/2018 ............. B01D 67/00

OTHER PUBLICATIONS

KR 101520196 (Year: 2015).*

* cited by examiner

*Primary Examiner* — Lawrence D Ferguson
(74) *Attorney, Agent, or Firm* — Winstead PC (57) ABSTRACT

In an embodiment, the present disclosure relates to a device having a substrate, a first polymeric layer, a second polymeric layer, a metallic layer, and a third polymeric layer. In some embodiments, the metallic layer is between the second polymeric layer and the third polymeric layer. In an additional embodiment, the present disclosure relates to a method of forming a metallic film. In some embodiments, the method includes depositing a first polymeric layer on a substrate, depositing a second polymeric layer on the first polymeric layer, depositing a metallic layer on the second polymeric layer, and depositing a third polymeric layer on the metallic layer. In some embodiments, the metallic layer is between the second polymeric layer and the third polymeric layer.

8 Claims, 5 Drawing Sheets

(51) Int. Cl.
*B32B 15/08* (2006.01)
*B32B 15/20* (2006.01)
*B32B 27/28* (2006.01)
*C03C 17/36* (2006.01)
*C03C 17/38* (2006.01)

(52) U.S. Cl.
CPC ........ *B32B 27/283* (2013.01); *C03C 17/3639* (2013.01); *C03C 17/38* (2013.01); *B32B 2250/03* (2013.01); *B32B 2250/05* (2013.01); *B32B 2250/40* (2013.01); *B32B 2264/0214* (2013.01); *B32B 2307/416* (2013.01); *B32B 2307/732* (2013.01); *B32B 2311/12* (2013.01); *B32B 2311/24* (2013.01); *B32B 2383/00* (2013.01); *B32B 2457/00* (2013.01); *B32B 2551/00* (2013.01)

(58) Field of Classification Search
CPC ............ B32B 2250/05; B32B 2250/40; B32B 2264/0214; B32B 2307/416; B32B 2307/732; B32B 2311/12; B32B 2311/24; B32B 2383/00; B32B 2457/00; B32B 2551/00; B32B 27/14; B32B 27/283; B32B 5/16; C03C 17/3639; C03C 17/38
See application file for complete search history.

Deposit bottom hard-mask 1
(PR1818, $Si_3N_4$, SU-8 Film)
FIG. 7A

Deposit top hard-mask 2
(PR1818, $Si_3N_4$, SU-8 Film)
FIG. 7F

Pattern bottom sensor array
using photolithography
FIG. 7B

Pattern top sensor array
using photolithography
FIG. 7G

Create $Si_3N_4$ hard-mask using
Reactive Ionic Etching
FIG. 7C

Create $Si_3N_4$ hard-mask using
RIE
FIG. 7H

Etch bottom half-sensor wells using
Deep Reactive Ionic Etching
FIG. 7D

Etch top half-sensor wells using
DRIE
FIG. 7I

Coat sensor wells w/ $SiO_2$ & mold
bottom-half PDMS sensor
FIG. 7E

Deposit parylene jammer & Al
FIG. 7J

Deposit top PDMS layer
FIG. 7K

SCALABLE FABRICATION OF WRINKLE-FREE AND STRESS-FREE METALLIC AND METALLIC OXIDE FILMS

CROSS-REFERENCE TO RELATED APPLICATIONS

This patent application claims priority from, and incorporates by reference the entire disclosure of, U.S. Provisional Application No. 62/837,560 filed on Apr. 23, 2019.

STATEMENT REGARDING FEDERALLY SPONSORED RESEARCH

This invention was made with government support under W911NF-17-1-0371 awarded by the Army Research Office. The government has certain rights in the invention.

TECHNICAL FIELD

The present disclosure relates generally to metallic and metallic oxide films and more particularly, but not by way of limitation, to compositions and methods for scalable fabrication of wrinkle-free and stress-free metallic and metallic oxide films.

BACKGROUND

This section provides background information to facilitate a better understanding of the various aspects of the disclosure. It should be understood that the statements in this section of this document are to be read in this light, and not as admissions of prior art.

Current metallic and metal oxide films, such as those utilized in microelectromechanical systems (MEMS), including, but not limited to, various sensors (e.g., optical, pressure, strain, and/or stress sensors) have complicated fabrication techniques. Currently, the fabrication of metallic films for use in MEMS, or other similar applications (e.g., semiconductor applications), involve techniques that are non-scalable, complex, and unsuitable for large substrates. Additionally, owing to the complex fabrication techniques currently available, metal-polymer pairs utilized in these metallic films are limited to specific materials that are unable to be interchanged. Fabrication of existing metallic films typically involves a metal film located on top of a compliant polymer substrate, and fabrication thereof leads to wrinkled and pre-stressed films that are optically rough and exhibit diffusive reflectivity. The present disclosure seeks to address the aforementioned limitations by providing wrinkle-free, stress-free, crack-free, and highly reflective metallic and metallic oxide films that can exhibit high sensitivity, for example, when used in various MEMS, such as, sensor systems and/or arrays.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure relates to a device having a substrate, a first polymeric layer on the substrate, a first nanoparticle layer on the first polymeric layer, a first metallic layer on the first nanoparticle layer, and a second polymeric layer on the first metallic layer. In some embodiments, the first metallic layer is between the first nanoparticle layer and the second polymeric layer. In some embodiments, the device further includes a second nanoparticle layer on the second polymeric layer, a second metallic layer on the second nanoparticle layer, and a third polymeric layer on the second metallic layer. In some embodiments, the second metallic layer is between the second nanoparticle layer and the third polymeric layer.

In an additional embodiment, the present disclosure relates to a method of forming a metallic film. In some embodiments, the method includes depositing a first polymeric layer on a substrate, depositing a first nanoparticle layer on the first polymeric layer, depositing a first metallic layer on the first nanoparticle layer, and depositing a second polymeric layer on the first metallic layer. In some embodiments, the first metallic layer is between the first nanoparticle layer and the second polymeric layer. In some embodiments, the method further includes depositing a second nanoparticle layer on the second polymeric layer, depositing a second metallic layer on the second nanoparticle layer, and depositing a third polymeric layer on the second metallic layer. In some embodiments, the second metallic layer is between the second nanoparticle layer and the third polymeric layer.

In a further embodiment, the present disclosure relates to a wrinkle-free and stress-free sensor. In some embodiments, the wrinkle-free and stress-free sensor includes a substrate and a first polymeric layer on the substrate. In some embodiments, the first polymeric layer has a thickness in a range of about 0.5 to about 1.5 mm. In some embodiments, the wrinkle-free and stress-free sensor further includes a first nanoparticle layer on the first polymeric layer. In some embodiments, the first nanoparticle layer has a thickness in a range of about 100 nm to about 1.5 um. In some embodiments, the wrinkle-free and stress-free sensor further includes a first metallic layer on the first nanoparticle layer. In some embodiments, the first metallic layer has a thickness in a range of about 25 nm to about 125 nm. In some embodiments, the wrinkle-free and stress-free sensor further includes a second polymeric layer on the metallic layer. In some embodiments, the second polymeric layer has a thickness in a range of about 10 um to about 150 um. In some embodiments, the wrinkle-free and stress-free sensor further includes a second nanoparticle layer on the second polymeric layer. In some embodiments, the second nanoparticle layer has a thickness in a range of about 100 nm to about 1.5 um. In some embodiments, the wrinkle-free and stress-free sensor further includes a second metallic layer on the second nanoparticle layer. In some embodiments, the second metallic layer has a thickness in a range of about 25 nm to about 125 nm. In some embodiments, the wrinkle-free and stress-free sensor further includes a third polymeric layer on the second metallic layer. In some embodiments, the third polymeric layer has a thickness in a range of about 10 um to about 150 um. In some embodiments, the first metallic layer is between the first nanoparticle layer and the second polymeric layer. In some embodiments, the second metallic layer is between the second nanoparticle layer and the third polymeric layer.

BRIEF DESCRIPTION OF THE DRAWINGS

A more complete understanding of the subject matter of the present disclosure may be obtained by reference to the following Detailed Description when taken in conjunction with the accompanying Drawings wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

In various aspects, the present disclosure relates generally to metallic and metallic oxide films and methods of fabrication thereof. In additional embodiments, the present disclosure relates generally to optical microelectromechanical systems (MEMS) which can measure, for example, strain and stress via sensors formed by the metallic films of the present disclosure. In some embodiments, the sensors are constructed by a wrinkle-free and stress-free nanometer reflective metallic thin film embedded within a polymeric matrix (e.g., an encapsulated polymer-metal-polymer configuration), which can then be coupled with a digital holographic interferometer thereby allowing the metallic films to be utilized as sensors, for example, strain and/or stress sensors. In some embodiments, the sensors constructed via the fabrication techniques disclosed herein can be optical sensors, micro-optic sensors, stress sensors, strain sensors, pressure sensors, sensor arrays, optical strain sensors, optical stress sensors, optical strain and stress sensors, or combinations thereof. As such, in particular embodiments, the present disclosure relates to strain sensors utilizing metallic and metallic oxide film fabrication methods as disclosed herein.

Figure 1:
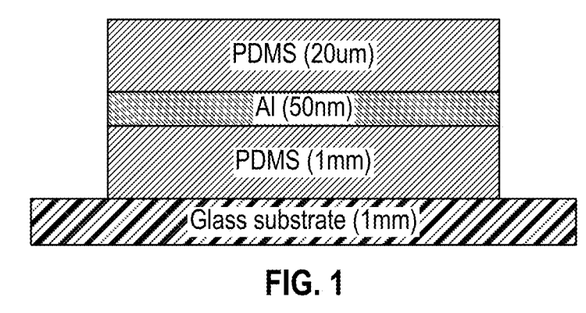
FIG. 1 illustrates an example of a metallic film with one metallic layer according to an aspect of the present disclosure.

Multiple components of the strain sensors of the present disclosure responsible for capturing strain deformation can be fabricated via a novel layer-on-layer fashion. According to some embodiments of the present disclosure, a bottom-up fabrication method can be utilized in which a polymeric layer of millimeter thickness is fabricated on top of a substrate (e.g., a transparent glass substrate), followed by a nanometer-thick layer (e.g., poly(p-xylylene), $SiO_2$, $TiO_2$) of nanoparticles. An approximately 50 to 100 nm metallic layer that can include, for example, aluminum, copper, silver, gold, or combinations of the same and like, can then be deposited over the aforementioned nanoparticle layer and enclosed by a micron-thick polymer layer on top. In some embodiments, this fabrication stabilizes the interface between the metal and polymer substrate so that the nanometer-thick metal film is wrinkle-free, residual-stress-free, and highly reflective. FIG. 1 illustrates an example of a metallic film with one metallic layer according to an aspect of the present disclosure. In some embodiments, the metallic films of the present disclosure can be structured.

Figure 2:
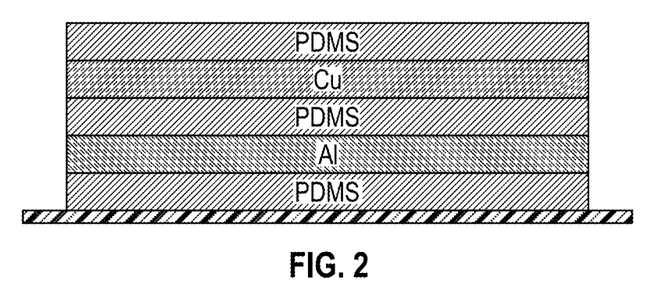
FIG. 2 illustrates an example of a metallic film with two metallic layers according to an aspect of the present disclosure.

Embodiments of the invention are directed to metallic and metallic oxide films comprising a nanoparticle layer and a metallic layer sandwiched between two polymeric layers. More specifically, a first polymeric layer is disposed on a substrate, a first nanoparticle layer is disposed on the first polymeric layer, followed by a first metallic layer disposed on the first nanoparticle layer and a second polymeric layer disposed on the first metallic layer to form a composite. In certain embodiments, multiple composites containing multiple polymeric layers, nanoparticle layers and metallic layers In some embodiments, this fabrication method allows for the metallic layer to be provided such that a specular reflector layer is formed by the metallic layer. In some embodiments, at least one of the polymeric layer and the metallic layer can be shadow masked to structure the shape of the metallic film or at least one of the polymeric layers. In some embodiments, and discussed in further detail below, multiple metallic layers can be utilized, as illustrated in FIG. 2. In some embodiments, the metallic films of the present disclosure can include a substrate, a first polymeric layer disposed on the substrate, a first nanoparticle layer disposed on the first polymeric layer, a first metallic layer disposed on the first nanoparticle layer, a second polymeric layer disposed on the first metallic layer, a second nanoparticle layer disposed on the second polymeric layer, a second metallic layer on the second nanoparticle layer, and a third polymeric layer disposed on the second metallic layer. In some embodiments, at least one of the polymeric layer and the metallic layer can be structured, for example, in polka dot fashion. In some embodiments, when two metallic layers are utilized, each metallic layer can have the same or different patterns and metallic materials.

In some embodiments, additional polymeric layers, nanoparticle layers and metallic layers can be added. In some embodiments, fewer layers can be utilized. For example, in some embodiments, the metallic films can be composed of a first polymeric layer on a substrate, a metallic layer on the first polymeric layer, and a first nanoparticle layer on the metallic layer. In some embodiments, the metallic films can be composed of a first polymeric layer on a substrate, a first metallic layer on the first polymeric layer, a first nanoparticle layer on the first metallic layer, a second metallic layer on the first nanoparticle layer, and a second polymeric layer on the second metallic layer.

Figure 3:
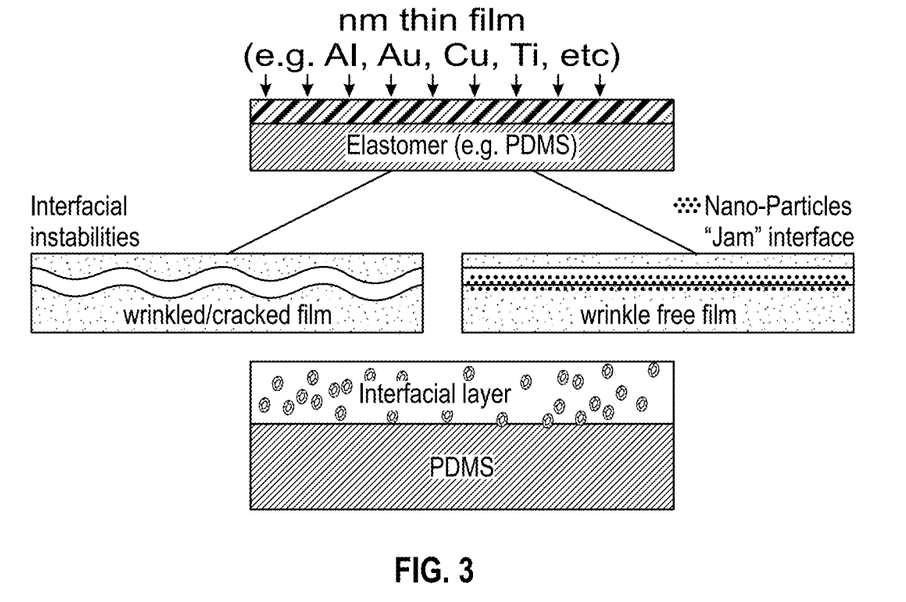
FIG. 3 illustrates interfacial jamming that occur between a polymeric layer and a metallic layer resulting in the formation of an interfacial layer that produces a wrinkle-free, crack-free, stress-free, and reflective flexible thin film.

Fabrications through layer-by-layer synthesis of a metallic layer over a polymeric substrate cause wrinkles and cracks to develop due to the persistent interfacial instabilities (Left side in FIG. 3). To prevent these instabilities from developing, the fabrication methods as disclosed herein, where a nanometer thick layer of nanoparticles is deposited immediately after the first polymeric layer and immediately followed by the deposition of a metal layer, are utilized. The nanometer thick nanoparticle layer (i.e. the first nanoparticle layer, dots in the right side in FIG. 3) layer reduces the mobility of the interface between the first polymeric layer and the first metallic layer, and in some embodiments, between the second polymeric layer and the second metallic layer, which consequently "jams" the interface to prevent the development of interfacial instabilities and subsequently produces a wrinkle-free, crack-free, residue stress-free, and specular reflective flexible thin film, as shown in FIG. 3. Novelty of the disclosed fabrication method lies in the utilization of a thin layer of nanoparticles (i.e. jammers) to suppress the interfacial instabilities (or interfacial jamming). The thickness of the metallic layer, the type of metal utilized and the deposition process involved (i.e. the amount energy injected into the interface), determines the type of nanoparticle jammers and the thickness of the layer. In some embodiments, the first nanoparticle layer is formed by partially cross-linked nanoparticle aggregates (e.g. Parylene). In some embodiments, the first nanoparticle layer is clusters of nanoparticles (e.g. $SiO_2$ aggregates generated by plasma enhanced vapor polymerization of tetraethoxysilane) deposited on the first polymeric layer.

In some embodiments, the fabrication methods can include physical deposition or chemical deposition of each of the polymeric layers and the metallic layers. For example, in some embodiments, physical vapor deposition techniques, such as, but not limited to, sputtering or evaporation methods can be utilized in the fabrication of the metallic films. In some embodiments, chemical deposition techniques, such as, but not limited to, chemical vapor deposition, plasma-enhanced chemical vapor deposition, and thermal oxidation methods can be utilized in the fabrication of the metallic films. In some embodiments, at least one of the polymeric layers and the metallic layers can be formed via spin coating. In some embodiments, after spin coating, the polymeric layers and the metallic layers can subsequently be cured by heat and UV radiations. In some embodiments, at least one of the polymeric layers and the metallic layers can be fabricated via drop cast methods.

Novel application of a nanometer-thick nanoparticle layer (e.g., poly(p-xylylene), $SiO_2$, $TiO_2$) stabilizes the interface between the metal and polymer substrate so that the encased metal film is wrinkle-free, residual-stress-free, and highly reflective. Encasing the reflective film within a polymer matrix enables the metallic films to inherit elastic characteristics of the polymers and improves the bonding between two diametrically different materials. This fabrication method prevents delamination, fracturing, and cracking of the reflective metal layer, even under large strain (e.g., a flexible mirror). Furthermore, the encasing of the reflective metal layer within the polymer matrix allows for flexible mirror-like properties of the metallic films.

In some embodiments, the metal within the metallic layer can include, but is not limited to, nanoparticles, aluminum, copper, silver, gold, nickel, cobalt, iron, transition metals, post-transition metals, metalloids, metal oxides, or combinations thereof. In some embodiments, the polymeric layers can be constructed of polymers including, but not limited to, gelatin, agar, poly(p-xylylene) polymers (e.g., Parylene-C), polydimethylsiloxane (PDMS), polysiloxane, silicone rubber, elastomers, organic polymers, inorganic polymers, or combinations thereof.

Given their advantageous properties, the metallic films of the present disclosure can be utilized as sensors. For example, as cells and/or tissue grow over the top polymer layer, a small nanometer deformation by cell-induced stresses can occur on the reflective film underneath, and subsequently can be captured by a holographic interferometer underneath the substrate, for example, a bottom glass substrate. In some embodiments, this process can be monitored in real-time. According to this particular embodiment, through finite element modeling of this layered composite, stresses imposed by cells and/or tissue can be obtained. As such, the metallic films of the present disclosure, when utilized as sensors, can be integrated with microfluidics, microfluidic devices, conventional alga plates, or commercially available tissue models to directly, and non-intrusively measure real-time stress generated by cell colonies and/or tissue.

Moreover, in some embodiments, the sensors of the present disclosure can provide for a stable and reliable platform to investigate and measure the normal (pressure) and shear (friction) stresses exerted by various cells due to growth, apoptosis, and/or necrosis. In various embodiments, the sensors disclosed herein can be utilized to measure deformation of cells during proliferation. In some embodiments, the sensors can be utilized, non-intrusively, to determine the metastatic state of cancer cells by measuring the mechanical characteristics of cell membranes, such as, for example, membrane stiffness, topography, and mechanical stresses. In another aspect of the present disclosure, the metallic films and/or sensors disclosed herein can additionally provide point-of-care blood analysis and circulating tumor cell identification and fingerprinting for early cancer detection. Furthermore, the metallic films and/or sensors disclosed herein can be used to perform mechanical fingerprinting of cells.

In addition, the metallic films disclosed herein can be utilized as highly sensitive flexible sensors, such as, but not limited to, pressure and shear sensors. In some embodiments, the sensors can be used as a pressure sensor for wearable, skin-conformed, electronics. Moreover, the sensors can be directly integrated into household objects for patient monitoring or elderly assistants.

In some embodiments, the sensors can be distributed as a sensor array. In some embodiments, the sensor array can be distributed over a hull of marine ships, thereby providing flexible MEMS pressure sensing arrays. In this particular embodiment, the sensors are envisioned to have application in assisting marine ship maintenance.

As discussed above, the present disclosure provides a wrinkle-free and stress-free metal film embedded within a polymer matrix. This metallic thin film device is optically smooth, highly reflective, and highly electrically conductive. In comparison to existing metallic films over polymer substrates, differences reside with respect to several aspects. First, the metallic films embedded within a polymer matrix, as disclosed herein, have substantial structural differences when compared to existing metallic films over polymer substrates. In existing metallic films, the metallic films are located on top of a compliant polymer substrate, while the present disclosure utilizes a metal layer sandwiched between two polymeric layers. Second, the metallic films, as disclosed herein, have significant surface property differences. In existing metallic films, the metal film is wrinkled (i.e., glossy) and/or pre-stressed (e.g., loaded), while the metallic films of the present disclosure are wrinkle-free and have no residual stress due, at least in part, to the sandwich configuration of the metallic layers disclosed herein.

Third, the metallic films, as disclosed herein, have varying optical and electrical properties when compared to currently available metallic films. The metallic films of the present disclosure are optically smooth (i.e., specular reflectivity) and electrically conductive. Currently available metallic films are optically rough (i.e., diffusive reflectivity) and electrically conductive. Fourth, the metallic films, as described herein, have fabrication techniques that vary with respect to current metallic films. Rather than complex, non-scalable, techniques, which are not suitable for large substrates, the fabrication of the metallic films as disclosed herein, are simple, scalable, and applicable to different metals and polymer pairs. Furthermore, unlike currently available methods, the fabrication of the metallic films disclosed herein can be utilized to fabricate multilayers of sandwiched polymer-metal composites, and can include various metals, for example, PDMS-Cu-PDMS-Al-PDMS composites.

Additionally, sensitivity of the sensors using the metallic films disclosed herein are higher than currently available sensors. At least partially owing to the stress-free properties of the metallic films, and thereby optical sensors utilizing these metallic films, the sensitivity of the strain sensors herein are high, with results indicating a value less than approximately 20 dyn/cm$^2$ (stress necessary to rupture a cell membrane is approximately 60 dyn/cm$^2$). Furthermore, the sensors of the present disclosure provide for non-intrusive optical measurements of strain deformation. As described above, a reflective layer formed by the metallic layer, for example, a specular reflector, can be sandwiched between two layers of polymers which can be protective biocompatible polymer materials. In this example, the biocompatible polymer materials can allow for seamless integration with, or direct construction of, bioassays for cell physiology studies, tissue engineering, and for identifying cell or tissue response to drugs, pollutants, and various other environmental factors. Moreover, the sensors disclosed herein provide for higher durability and versatility as compared to those currently available and formed via traditional fabrication methods. The sensors of the present disclosure are highly versatility and have wide tunable ranges that can be achieved by selecting different metals and polymers that are suited for different types of applications. Currently, the metal and polymer pairs in available sensors are limited to specific materials that are unable to be interchanged due to complex, non-scalable, techniques used in their fabrication. This limits the versatility and ability to tune sensors into a wide variety of ranges for varying application. The fabrication methods presented herein alleviate this problem, as different metals and polymers that are suited for different applications can be employed.

In some embodiments, a device, such as, for example, a sensor, can include a substrate, a first polymeric layer on the substrate, a first nanoparticle layer disposed on the first polymeric layer, a metallic layer disposed on the first nanoparticle layer, and a second polymeric layer on the metallic layer. In some embodiments, the device further includes, a second nanoparticle layer disposed on the second polymeric layer, a second metallic layer on the second nanoparticle layer, and a third polymeric layer disposed on the second metallic layer. In some embodiments, a metallic layer is sandwiched, or encased, between the first nanoparticle layer and the second polymeric layer. In some embodiments, a first metallic layer is located between the first nanoparticle layer and the second polymeric layer. In various embodiments, the second metallic layer is sandwiched, or encased, between the second nanoparticle layer and the third polymeric layer.

In some embodiment, a device, such as, for example, a sensor, can include a substrate, a first polymeric layer on the substrate, a first metallic layer on the first polymeric layer, and a first nanoparticle layer on the first metallic layer. In some embodiments, the device further includes, a second metallic layer disposed on the first nanoparticle layer, and a second polymeric layer on the second metallic layer. In some embodiments, the metallic layer is sandwiched, or encased, between the first polymeric layer and the first nanoparticle layer. In various embodiments, the second metallic layer is sandwiched, or encased, between the first nanoparticle layer and the second polymeric layer.

In some embodiments, the substrate can include, but is not limited to, a base material, a glass substrate, a transparent glass substrate, silicon, metal, or combinations thereof. In various embodiments, the polymeric layers can include, but is not limited to, poly(p-xylylene), polydimethylsiloxane, or combinations thereof. In some embodiments, the nanoparticle layers include poly(p-xylylene), $SiO_2$, $TiO_2$ and/or combinations thereof.

In various embodiments, the metallic layer is a thin film including, but not limited to, at least one of nanoparticles, aluminum, copper, silver, gold, nickel, cobalt, iron, transition metals, post-transition metals, metalloids, metal oxides, and combinations thereof. In particular embodiments, the metallic layer is an aluminum thin film or a copper thin film. In some embodiments, the second metallic layer is a thin film including, but not limited to, at least one of nanoparticles, aluminum, copper, silver, gold, nickel, cobalt, iron, transition metals, post-transition metals, metalloids, metal oxides, and combinations thereof. In particular embodiments, the second metallic layer is an aluminum thin film or a copper thin film.

In some embodiments, the polymeric layer is in a range of about 0.5 to about 1.5 mm thick. In some embodiments, the polymeric layer can be in a range of about 25 um to 150 um. In a particular embodiment, the first polymeric layer is about 1 mm thick. In general, the thickness of the polymeric layers can range from nanometer to centimeter thickness. In some embodiments, the nanoparticle layer is in a range of about 150 nm to about 1.5 um thick. In a particular embodiment, the nanoparticle layer is about 1 um thick. In various embodiments, the metallic layer is in a range of about 25 nm to about 10 um thick. In a particular embodiment, the metallic layer is less than 125 nm thick.

In some embodiments, the device is a strain and stress sensor. In various embodiments, the strain and stress sensor is wrinkle-free and/or stress-free. In some embodiments, the strain and stress sensor is reflective. In various embodiments, the strain and stress sensor is utilized to be integrated with microfluidics or microfluidic devices, measure real-time stress generated by cell colonies and tissue, provide blood analysis and identify circulating tumor cell identification and fingerprinting, or combinations thereof. In various embodiments, the stress and strain sensor is distributed as an array of sensors over a marine ship hull as flexible microelectromechanical systems for pressure sensing.

Working Examples

Reference will now be made to more specific embodiments of the present disclosure and data that provides support for such embodiments. However, it should be noted that the disclosure below is for illustrative purposes only and is not intended to limit the scope of the claimed subject matter in any way.

Fabrication Technique.

The fabrication of the device is started by mixing a mixture of SYLGARD™ 184 with a curing agent at a 10:1 ratio to prepare the PDMS elastomer. After degassing, the PDMS is poured on a glass slide and cured at 65° C. for 24 hours. The cured PDMS is exposed to oxygen plasma at 30 W for 30 sec, following a one-micrometer deposition of Parylene-C. The deposited Parylene-C is exposed to oxygen plasma at 30 W for 30 sec. A 50 nanometer-thick aluminum sputter deposited on the PDMS-Parylene-C bilayer, during which a shadow mask can be applied to structure the shape of the reflector. Finally, a micron-thick PDMS layer is spin coated and cured at 65° C. for 24 hrs. A single layer of sandwiched optical sensor is fabricated. The abovementioned procedure can be repeated to generate multilayer composites. Once the sensor layer is constructed, it can be bonded with a microfluidic channel or a MEMS device for cell/tissue culture, as well as being later integrated with an interferometer apparatus.

Single Layer Polymer-Metal-Polymer Stress/Pressure Sensor.

An embedded layer of a reflective metal (aluminum) is sandwiched between polymer matrixes. The single layer polymer-metal-polymer stress/pressure sensor is composed of, bottom up, or away from, the substrate, in the following order: (1) glass substrate; (2) 1 mm thick PDMS polymer; (3) 1 um thick Parylene-C polymer; (4) 50 nm aluminum thin film; and (5) 20 um thick PDMS polymer. The sensor is integrated with a microfluidic channel and a long-term culturing loop to facilitate tissue growth. The integrated sensor platform is placed over a holographic interferometer including a laser source, a 50/50 beam splitter, a reference reflection mirror, an imaging lens, and a digital camera.

Double Layers of Polymer-Metal-Polymer Composite Multi-Function Sensor.

Double reflective metal thin films are embedded within isolated polymer matrixes. The double layers of polymer-metal-polymer composite multi-function sensor is composed of, bottom up, or away from, the substrate (a), in the following order: (a) glass substrate; (b) 1 mm thick PDMS polymer; (c) 1 um thick Parylene-C polymer; (d) 50 nm aluminum thin film; (e) 100 um thick PDMS polymer; (f) 1 um thick Parylene-C polymer; (g) 40 nm copper thin film; and (h) 25 um thick PDMS polymer. The multi-layer sensor is integrated with microfluidics and placed over a holographic interferometer as described above with respect to the single layer polymer-metal-polymer stress/pressure sensor.

Measurement of Biofilm Stresses in Laminar Flows by a Digital Holography Interferometry (DHI) and an Embedded Wrinkle-Free Thin Film Polymer Mirror.

In nature, most bacteria live on surfaces and experience more mechanical stresses, and over a greater range of values, than do bacteria in fluid suspension. Various species of bacteria initiate biological responses when they have attached to a surface. Many surface-attached bacteria mature into biofilms, interacting communities of microbes bound together in a matrix made up of polymers and proteins. One of the changes in a bacterium's environment when it transitions from being suspended in a fluid to being attached to a substrate is a change in the mechanical characteristics of the environment.

Bacterial cell bodies are typically on the order of 1 um in length and can undergo deformation by various forces, such as, but not limited to, fluid shear stress, adhesion forces, bulk pressure forces, or combinations of the same and like. Stiffness of a bacterial cell envelope can control how much it is deformed by adhesion and/or contact forces. Bacteria has various appendages, for example, but not limited to, pili and flagella. Pili are typically on the order of 5 to 8 nm in diameter, and a single pilus motor can generate a force greater than 100 pN. Flagella are typically on the order of 20 nm in diameter. A single flagellum motor can have a torque of couple of thousand pN nm.

In some embodiments, the metallic films of the present disclosure allow for the measurement of forces generated by biofilms, with nano-newton precision and sub-micrometer spatial resolution, on the substratum. Additionally, the metallic films of the present disclosure allow for the investigation of the effects of flow on biofilm deformation and/or detachment. For example, the metallic films of the present disclosure allow for: (a) fabrication of a flexible mirror substrata with high compliance that allow lower forces to be detected utilizing digital holographic interferometry (DHI); (b) setup of ecology-on-chip experiments to monitor and record biofilm deformation due different flow sheers; and (c) provide measurement data of substratum deformation utilizing DHI.

In some embodiments, a flexible mirror can be fabricated, for example, by depositing a millimeter thick planer polydimethylsiloxane (PDMS) layer on a glass substrate, depositing a wrinkle-free and crack-free reflective aluminum thin film on the PDMS layer, and depositing a top protective coating on the aluminum thin film. In such embodiments, the flexible mirror has the ability to deform in response to forces and recover to its initial state after release of the force and is sensitive to pN range forces. In some embodiments, the aluminum thin film is approximately 50 nm. In some embodiments, the protective coating is approximately 20 um.

In some embodiments, the flexible mirror can be fabricated using multiple metallic layers. For example, in some embodiments, the flexible mirror can be fabricated by depositing a first polydimethylsiloxane (PDMS) layer on a glass substrate, depositing a wrinkle-free and crack-free aluminum thin film on the first PDMS layer, depositing a second PDMS layer on the aluminum thin film, depositing a wrinkle-free and crack free copper thin film on the second PDMS layer, and depositing a third PDMS layer on the copper thin film.

Many challenges exist in fabricating flexible mirrors. For example, a metal film deposited on a soft substrate undergoes a high compressive stress (or strain) due to various factors including, but not limited to, thermal mismatch. When the compressive stress is beyond a critical value, the film-substrate system will undergo a prominent surface instability (i.e., out-of-plane deformation), resulting in many complex and fascinating buckling patterns. There are two classes of typical buckling patterns, that is, surface wrinkling and buckle delamination, depending on the substrate stiffness and interfacial bonding strength. Wrinkling is usually observed in the case of relatively soft substrate material, where the film remains well attached to the substrate surface. Results indicated that confinement of PDMS did not produce a reflective aluminum coated surface, and that when aluminum was deposited on a dry photoresist and/or transferred on PDMS, cracks were observed.

Figure 4A:
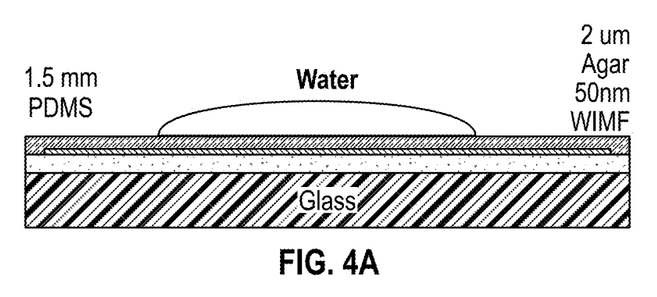
FIG. 4A illustrates a 50 nm wrinkle-free metallic thin film in polymer (WIMF) sandwiched between a 2 um film of agar and a 1.5 mm polydimethylsiloxane (PDMS) layer on a glass substrate.
Figure 4B:
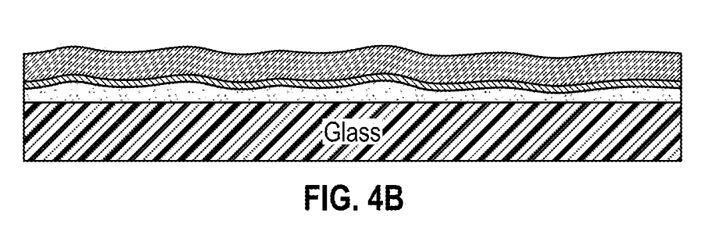
FIG. 4B illustrates that when the 2 um agar film is dehydrated, the agar film wrinkles the WIMF to generate a microscopic pattern.
Figure 4C:
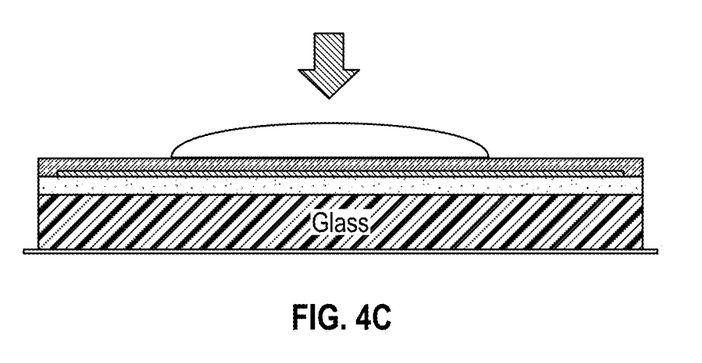
FIG. 4C illustrates that hydration of the agar relieves the interfacial stresses.

Additionally, utilizing the metallic films of the present disclosure enhances thin film elasticity properties. As such, the metallic films disclosed herein exhibit high sensitivity for stress and/or strain measurements. In general, measurements can be made by analyzing interfacial stresses acting on the metallic films. For example, as illustrated in FIG. 4A a 50 nm wrinkle-free metallic thin film in polymer (WIMF) is sandwiched between a 2 um film of agar and a 1.5 mm PDMS layer on a glass substrate. As shown in FIG. 4B, when the 2 um agar film is dehydrated, the agar film wrinkles the WIMF to generate a microscopic pattern. Hydration of the agar relieves the interfacial stresses as illustrated in FIG. 4C. Both normal and shear stress (surface stresses) can be measured via deformation of the WIMF.

Figure 5:
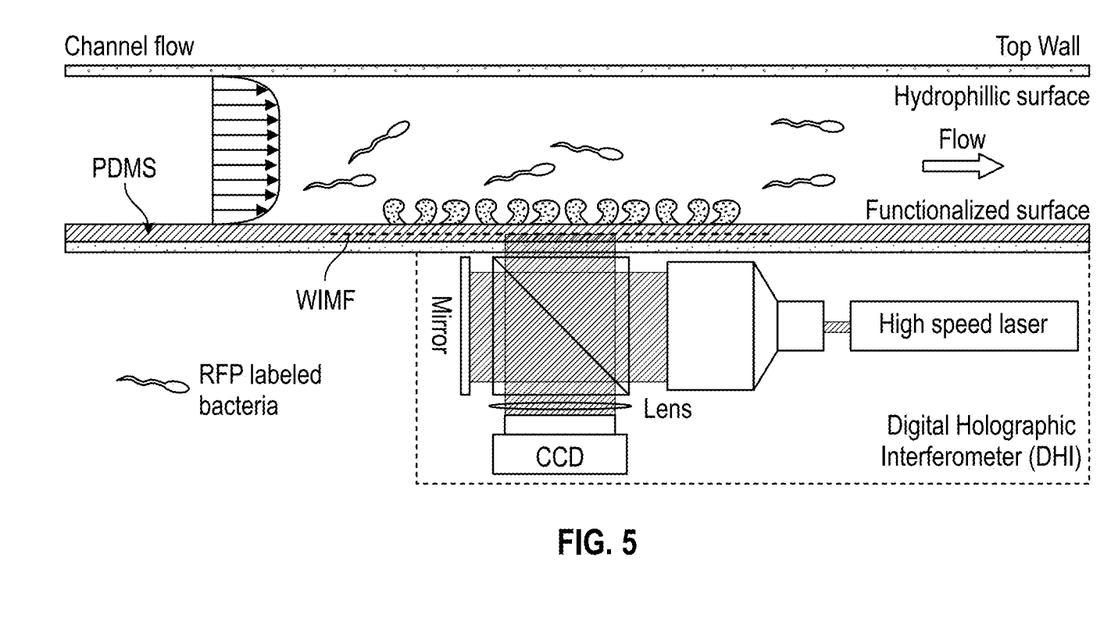
FIG. 5 illustrates an example setup depicting a channel formed where at least a portion of a wall in the channel includes a WIMF embedded in a polymeric layer.

In a similar manner, quantification of biofilm stresses can be obtained using a wrinkle-free metallic thin film in polymer (WIMF) in conjunction with digital holographic interferometry (DHI). In an example setup, as illustrated in FIG. 5, a channel can be formed wherein at least a portion of a wall in the channel includes a WIMF embedded in a polymeric layer (e.g., PDMS). In this instance, one side of the polymeric layer can be functionalized to thereby form a functionalized surface in the channel. Similarly, the opposing side wall can have a hydrophilic surface. A DHI can be arranged to gather stress and strain data from the WIMF to detect nano-scale and nano-sized strain deformation caused by biofilm stresses on the functionalized surface of the channel. As such, a wrinkle-free, crack-free, and reflective mirror can be fabricated utilizing the methods presented herein, and furthermore, successful DHI measurements of a WIMF can be captured.

Pressure and Shear Measurements Using Optical Thin Film µSensor Array and Digital Holographic Interferometry (DHI).

Figure 6A:
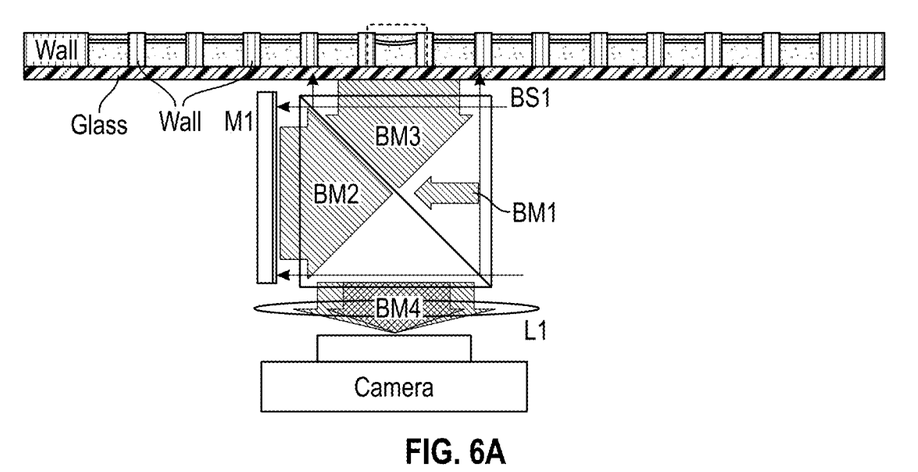
FIG. 6A illustrates a sensor array schematic according to an aspect of the present disclosure.

Similar to the embodiments described above, the metallic films of the present disclosure can be utilized in the form of a wrinkle-free metallic nano film in polymer (WiMP) to form sensors utilized in an array. A sensor schematic is illustrated in FIG. 6A. As depicted in FIG. 6A, a digital holographic interferometer has a layout as illustrated, with M1 being a mirror, L1 being an imagine lens, and BS1 being a 50/50 beam splitter. The optical layout is illustrated as BM1 being a collimated illuminating laser beam, BM2 being a reference beam, BM3 being an object beam, and BM4 being interference.

Figure 6B:
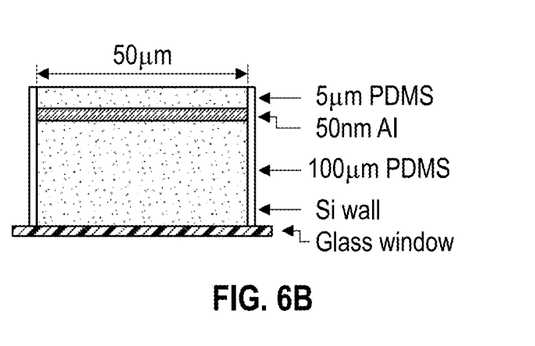
FIG. 6B illustrates a single polymer-metal thin film stress sensor (pixel) of FIG. 6A according to an aspect of the present disclosure.
Figure 7A:
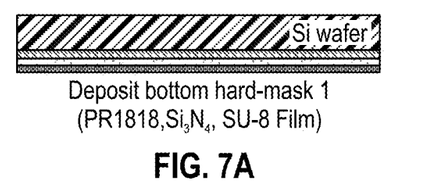
FIGS. 7A, 7B, 7C, 7D, 7E, 7F, 7G, 7H, 7I, 7J and 7K illustrates μsensors synthesized directly upon a solid substrate using dry etching and deposition fabrication methods.
Figure 7B:
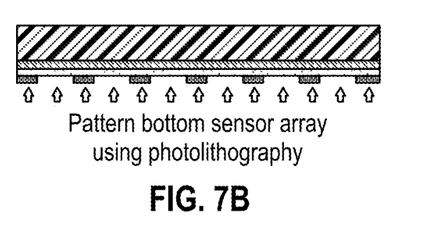
Figure 7C:
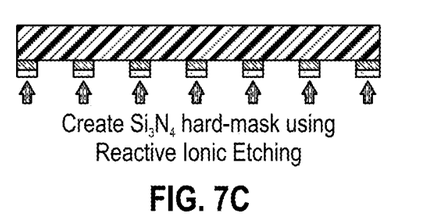
Figure 7D:
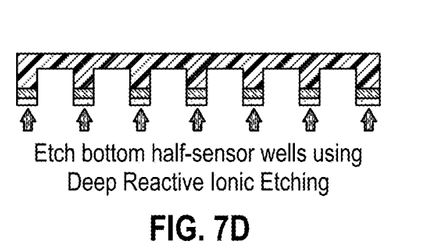
Figure 7E:
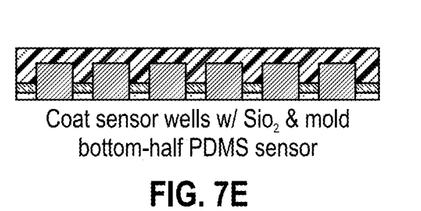
Figure 7F:
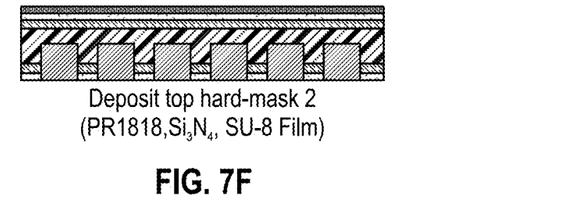
Figure 7G:
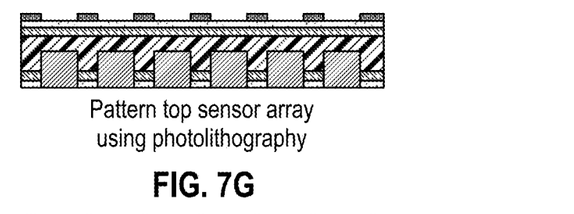
Figure 7H:
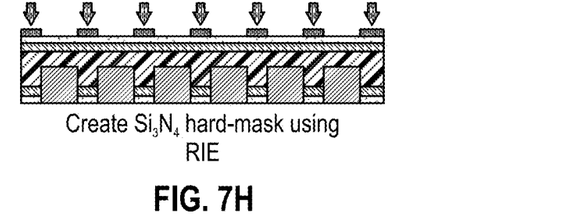
Figure 7I:
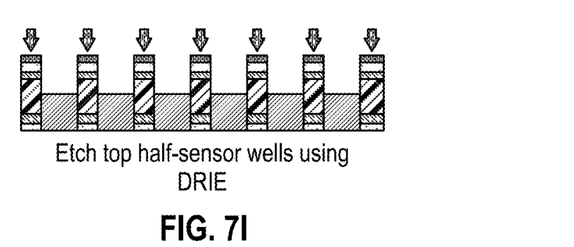
Figure 7J:
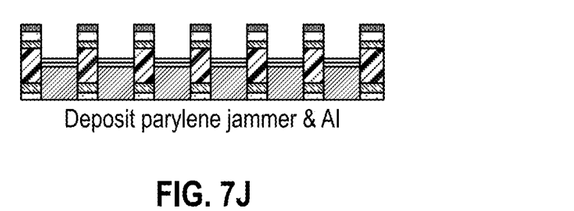
Figure 7K:
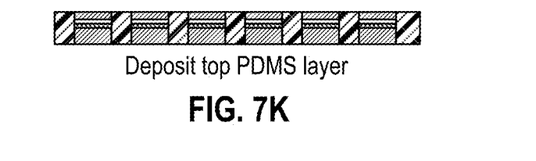

As shown in FIG. 6B, a single polymer-metal thin film stress sensor (pixel) is depicted. In this particular embodiment, each pixel is 50 um in width and is composed of a 100 um PDMS layer on a glass window, having a 50 nm aluminum wrinkle-free and stress-free metallic film and a 5 um PDMS film on top. According to this setup, deformation within a single sensor can identify flow pressure, shear pressure, and surfaces stresses (e.g., normal and shear stresses).

In some embodiments, a two-step microfabrication processes to create polymer-metal µPillar array embedded within a perforated Si-wafer. Each µPillar (µSensor) is composed of (from top to bottom): (i) 5 um polymer-gel mixture (e.g., PDMS); (ii) 50 nm wrinkle-free stress-free metallic film (i.e, reflective); and (iii) 95 um polymer-gel mixture (e.g., PDMS). The viscoelasticity of µSensors can be tuned by varying the polymer to gel ratio. µPillars within a solid substrate are only open to the flow. Deformation of µPillars can only be caused by viscous stresses and pressure locally. Embedding a reflective thin film in µPillars enable the measurement of 3D deformation by obtaining 2D thin film profiles. Pressure and normal stress cause symmetric axial deformation and shear stress asymmetric axial deformation. These deformations are in nanometers and difficult to measure using conventional methods relying on imaging tracers, such as, for example, particles, qDot, or combinations of the same and like.

Synthesis of a reflective thin-film in polymer allows interferometry measurement capable of nanometer resolution. µSensors are synthesized directly step-by-step, as illustrated in FIG. 7A to FIG. 7K, within its solid substrate using dry etching and deposition fabrication methods. Residue stresses are small, and this ensures the high measurement resolution of stresses. Large arrays of µSensors can be synthesized and nano-scale deformation can be obtained non-intrusively over a large area. In this fashion, sensing wall flow stresses (shear and pressure) can be conducted by tracking nanoscale strain deformation of the polymer µPillars (µSensors) flush-mounted in a wall. Pressure (normal stress) causes nanoscale elastic concentric axial deformation, while shear stress causes nanoscale skewed axial deformation (e.g., wrinkles). 3D strain in soft µPillars embedded in solid substrate are caused by forces imposed at the top surface. 3D strain of µPillars are marked by the surface profile of a nanometer thin film embedded in the µPillars. Calibration and modeling of viscoelastic µPillars under stresses relates 2D thin film deformation to stresses on the sensor top. This allows variable ranges by tuning polymer elasticity. As such, measuring nanoscale deformation using digital holographic interferometry is achievable.

In some embodiments, the device is a wrinkle-free and stress-free sensor that can include, without limitation, a strain sensor, a stress sensor, an optical sensor, an optical stress sensor, an optical strain sensor, a strain and stress sensor, an optical strain and stress sensor, a pressure sensor, a micro-optic sensor, or combinations thereof. In some embodiments, the metallic layer is a specular reflector layer.

In some embodiments, the substrate can include, without limitation, a base material, a glass substrate, a transparent glass substrate, or combinations thereof. In some embodiments, the first polymeric layer, the second polymeric layer, and the third polymeric layer can include, without limitation, gelatin, agar, poly(p-xylylene) polymers, polydimethylsiloxane (PDMS), polysiloxane, silicone rubber, elastomers, organic polymers, inorganic polymers, or combinations thereof. In some embodiments, the fourth polymeric layer and the fifth polymeric layer can include, without limitation, gelatin, agar, poly(p-xylylene) polymers, polydimethylsiloxane (PDMS), polysiloxane, silicone rubber, elastomers, organic polymers, inorganic polymers, or combinations thereof.

In some embodiments, the metallic layer is a thin film layer composed of at least one of nanoparticles, aluminum, copper, silver, gold, nickel, cobalt, iron, transition metals, post-transition metals, metalloids, metal oxides, and combinations thereof. In some embodiments, the second metallic layer is a thin film layer composed of at least one of nanoparticles, aluminum, copper, silver, gold, nickel, cobalt, iron, transition metals, post-transition metals, metalloids, metal oxides, and combinations thereof. In some embodiments, depositing the metallic layer on the second polymeric layer forms a specular reflector layer.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A method of forming a metallic film, the method comprising:
    disposing a first polymeric layer on a solid substrate, wherein the substrate is glass, metal or silicon, and wherein the first polymeric layer has a thickness in a range of about 0.5 mm to about 1.5 mm;
    disposing a first nanoparticle layer on the first polymeric layer, wherein the first nanoparticle layer has a thickness in a range of about 100 nm to about 1.5 μm;
    disposing a first metallic layer on the first nanoparticle layer, wherein the first metallic layer has a thickness in a range of about 25 nm to about 125 nm; and
    disposing a second polymeric layer on the first metallic layer, wherein the first metallic layer is between the first nanoparticle layer and the second polymeric layer, and wherein the second polymeric layer has a thickness in a range of about 10 μm to about 150 μm.

2. The method of claim 1, comprising:
    depositing a second nanoparticle layer on the second polymeric layer;
    depositing a second metallic layer on the second nanoparticle layer; and
    depositing a third polymeric layer on the second metallic layer, wherein the second metallic layer is between the second nanoparticle layer and the third polymeric layer.

3. The method of claim 1, wherein the glass substrate is a transparent glass substrate.

4. The method of claim 1, wherein the first polymeric layer and the second polymeric layer is selected from the group consisting of gelatin, agar, poly (p-xylylene) polymers, polydimethylsiloxane (PDMS), polysiloxane, silicone rubber, elastomers, organic polymers, inorganic polymers, or combinations thereof.

5. The method of claim 1, wherein the third polymeric layer is selected from the group consisting of gelatin, agar, poly (p-xylylene) polymers, polydimethylsiloxane (PDMS), polysiloxane, silicone rubber, elastomers, organic polymers, inorganic polymers, or combinations thereof.

6. The method of claim 1, wherein the first metallic layer is a thin film layer comprising at least one of nanoparticles, aluminum, copper, silver, gold, nickel, cobalt, iron, transition metals, post-transition metals, metalloids, metal oxides, and combinations thereof.

7. The method of claim 1, wherein the second metallic layer is a thin film layer comprising at least one of nanoparticles, aluminum, copper, silver, gold, nickel, cobalt, iron, transition metals, post-transition metals, metalloids, metal oxides, and combinations thereof.

8. The method of claim 1, wherein disposing the first metallic layer on the first nanoparticle layer forms a specular reflector layer.

* * * * *